United States Patent [19]  
Weitman

[11] Patent Number: 4,681,744  
[45] Date of Patent: Jul. 21, 1987

[54] HEAT RECOVERY DEVICE

[76] Inventor: Jacob Weitman, Tryffelstigen 8, S-611 63 Nyköping, Sweden

[21] Appl. No.: 783,229
[22] PCT Filed: Jan. 25, 1985
[86] PCT No.: PCT/SE85/00031
  § 371 Date: Sep. 26, 1985
  § 102(e) Date: Sep. 26, 1985
[87] PCT Pub. No.: WO85/03342
  PCT Pub. Date: Aug. 1, 1985

[30] Foreign Application Priority Data

Jan. 27, 1984 [SE] Sweden .............................. 84580026

[51] Int. Cl.⁴ ............................................. B01D 53/34
[52] U.S. Cl. ........................................ 422/173; 55/73; 55/222; 55/240; 55/269; 165/60; 165/133; 165/134.1; 208/47; 261/3; 261/153; 261/DIG. 9; 422/200
[58] Field of Search .................. 261/3, 122, 130, 146, 261/147, 151, 153, DIG. 9; 134/22.11-22.13; 422/173, 198, 200; 208/47; 165/60, 84, 133, 134.1; 55/73, 80, 222, 228, 240, 267-269

[56] References Cited

U.S. PATENT DOCUMENTS

| 2,280,633 | 4/1942 | Crawford | 261/147 X |
| 2,798,570 | 7/1957 | Kelley | 55/222 X |
| 2,911,351 | 11/1959 | Hill | 208/47 |
| 3,522,000 | 7/1970 | Kinney | 55/222 X |
| 3,844,740 | 10/1974 | Brandt | 55/222 X |
| 3,927,153 | 12/1975 | Tarhan | 261/151 X |
| 4,287,938 | 9/1981 | Lagerquist et al. | 55/222 X |
| 4,305,909 | 12/1981 | Willett et al. | 422/173 X |

FOREIGN PATENT DOCUMENTS

| 118977 | 6/1947 | Sweden . |
| 425215 | 9/1982 | Sweden . |
| 431063 | 11/1984 | Sweden . |
| 1042387 | 9/1966 | United Kingdom . |

Primary Examiner—Richard L. Chiesa  
Attorney, Agent, or Firm—Witherspoon & Hargest

[57] ABSTRACT

Heat recovery from corrosive gases such as sulphurous flue gases and/or flue gases containing organic acids, said corrosive gases being conducted through a primary side of heat exchanger means (I-II) provided in a gas duct (1).

Said heat exchanger means are provided with means for repeatedly applying, during normal operation of said heat exchanger means, a protective controllable thin layer to the surfaces of said heat exchanger means, at least whenever the temperature of said corrosive gases exceeds the water dew point, in order to protect said surfaces from corrosion.

6 Claims, 2 Drawing Figures

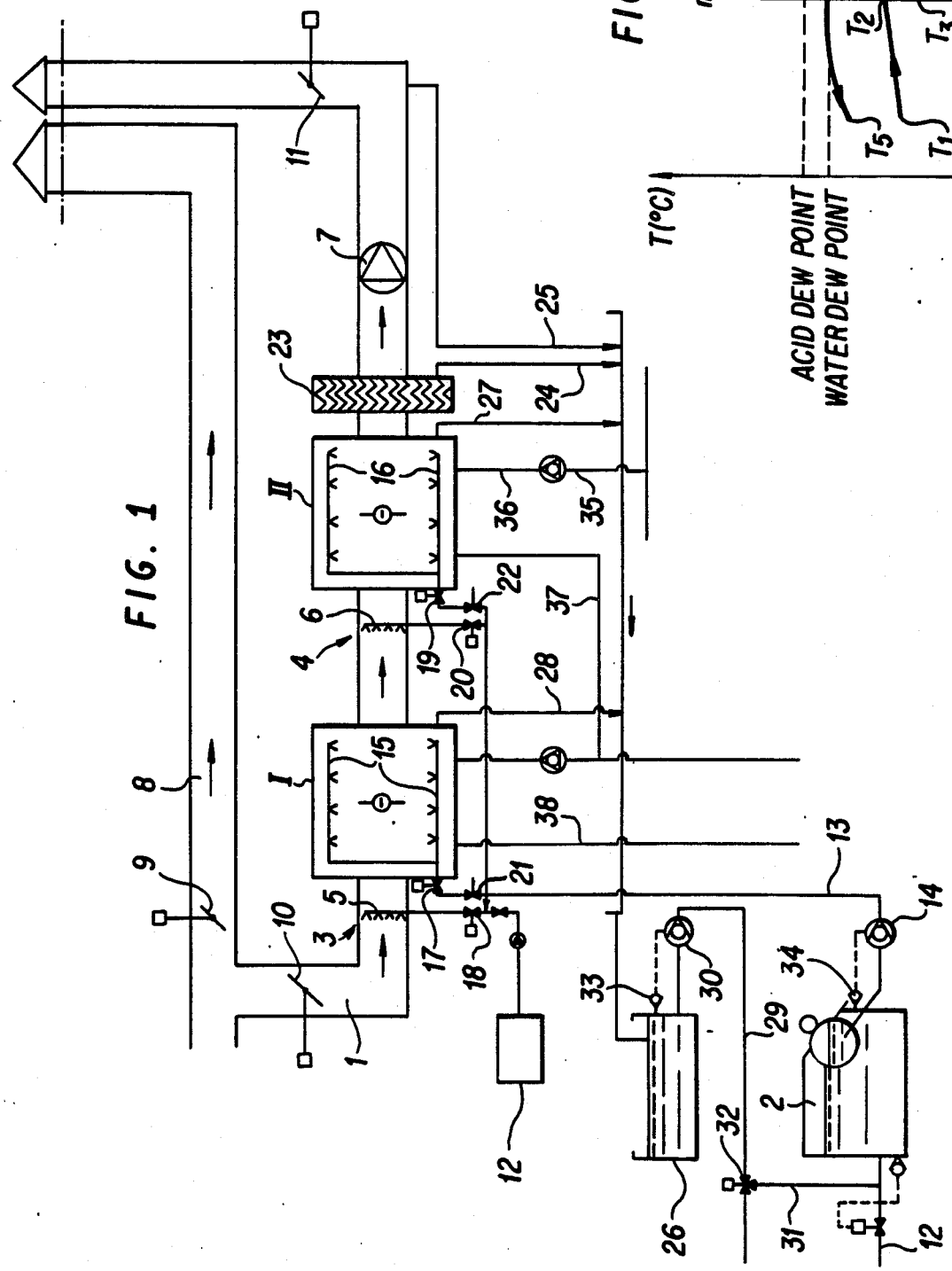
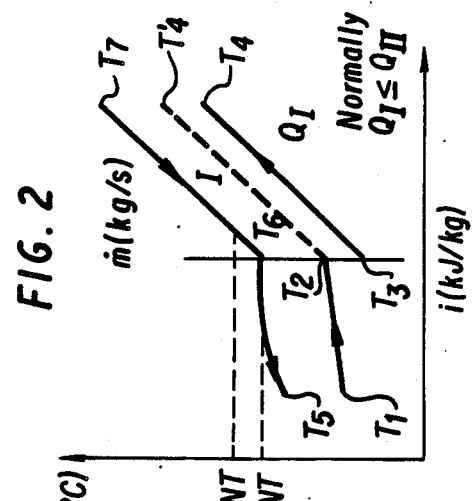
FIG. 1
FIG. 2

HEAT RECOVERY DEVICE

The invention is related to a heat recovery device to recover heat from corrosive gases such as sulphurous flue gases and/or flue gases containing organic acids, said corrosive gases being conducted through a primary side of heat exchanger means provided in a gas duct.

When oil, coal and similar sulphurous fuels are burned, the flue gases emitted therefrom will typically bring with them about 10–15 percent of the combustion heat of the fuel. Therefore, great efforts are made to cool said flue gases in order to recover as much energy as possible. However, corrosion problems occur in the heat exchangers through which said flue gases are conducted. It is known that the greatest corrosion effects on the surfaces of said heat exchanger means occur when the temperature of said surfaces being in contact with said flue gases is lowered past the acid dew point and until the temperature passes the water dew point.

Recovering a large portion of the heat of the flue gases requires, for many common fuels, that the flue gases are cooled well below the acid dew point, which necessitates that the consequent corrosion problems be managed. In known applications the surfaces of heat exchangers placed in a flue gas duct are protected from a corrosion attack by using glass, ceramics or other corrosion resistant materials in the heat exchangers. However, such heat exchangers are expensive and difficult to manufacture, due, e.g., to sealing problems at the tube ends.

When less expensive heat exchangers of metal are used, the main problem heretofore has been to protect the surfaces of the cooling devices and, therefore, a great demand exists for an improved method to recover as much energy as possible.

By spraying water into the flue gases, it is possible to increase the water dew point of the flue gases. It can be shown that this will decrease the acid concentration of the condensing acid drops, when formed on the cooling surfaces. However, when spraying water into the flue gases and/or onto the cooling surfaces, the temperature of the flue gases is lowered substantially, thus increasing the portion of low grade waste heat (below water dew point) at the expense of the more valuable waste heat initially available at higher temperatures.

The energy which can be recovered from the flue gases by heat exchanging is a function of the enthalpy of the flue gases. The total enthalpy can, with sufficient practical accuracy, be written as $i_{tot} = i_{dry} + i_{wet}$, where $i_{dry}$ is the energy due to dry heat, and $i_{wet}$ is the condensation heat of the water vapor.

Accordingly, a main object of the invention is to provide a versatile heat recovery method and device which, in general application, permits both $i_{dry}$ and $i_{wet}$ to be recovered with as small restrictions as possible with respect to the thermo-technical aspects. The ideal thermo-technical characteristics must not be sacrificed for the corrosion aspects.

This object is achieved according to the invention by means of a heat recovery device, which is characterized in that said heat exchanger means are provided with means for repeatedly applying, during normal operation of said heat exchanger means, a protective controllable thin layer onto the surfaces of said heat exchanger means, at least when the temperature of said corrosive gases exceeds the water dew point, in order to protect said surfaces from corrosion.

While primarily aiming at a thermodynamically efficient and, from a practical point of view, very flexible and versatile method and equipment for heat recovery from the flue gases, the invention also incorporates methods and means for removing, from the flue gases, environmentally hazardous substances, like $SO_2$. Said cleaning of the flue gases is accomplished by using the second stage of the recovery system as a combined heat exchanger and a wet scrubber. The scrubbing liquid may, whenever alkaline waste waters are available, be the alkaline waste water itself, thereby providing a possibility to neutralize alkaline waste waters before being discharged into, e.g., a municipal treatment plant. This is possible because of the automatic self-cleaning ability incorporated into the heat exchangers utilized for both the first and the second recovery stages.

Preferred embodiments of the invention are given the characteristics of the subclaims.

BRIEF DESCRIPTION OF THE DRAWINGS

A preferred embodiment of the invention is to be described in the following with reference to the accompanying drawing.

FIG. 1 shows schematically a block diagram of a heat recovery device according to the invention.

FIG. 2 is a curve chart illustrating the relation between the temperature and enthalpy levels of media flowing through said heat recovery device.

DETAILED DESCRIPTION OF THE DRAWINGS

FIG. 1 shows a block diagram comprising a first heat exchanger I and a second heat exchanger II. The flue gases from, e.g., boilers are conducted to the inlet of the device according to the invention. When the flue gases have passed through said device the exhaust gases are conducted to a chimney. If a chimney exists and is built up of common bricks the risk occurs that the wet exhaust gases could cause the chimney to disintegrate, and therefore an extra chimney is built which is made of an acid proof material, and is anchored outside of the existing chimney. As can be seen in FIG. 1 the heat recovery device also comprises a flue gas duct 1 through which sulphurous flue gases and/or flue gases containing organic acids are being conducted. A cleaning device 2, e.g. of the type described in the Swedish Pat. No. 8006389-4 in the name of the Applicant, is provided to clean waste water which is used in the heat exchangers and which will be described further below. The flue gasses are conducted through the inlet of the flue gas duct 1 consisting of a first chamber 3 and a second chamber 4 in which the gas is subjected to a spraying fluid by means of nozzles 5 and 6, respectively, described more in detail below.

Preferably at least one fan 7 is placed in said duct, said fan being incorporated in order to compensate for the gas pressure losses in the recovery/scubber system.

A flue gas duct 8 is arranged to conduct flue gases directly to the existing chimney. By controlling draught valves 9, 10 and 11 in said flue gas ducts the flue gas can, on one hand, be directed to the existing chimney and, on the other hand, entirely or partly be directed to the by-pass flue gas duct 1 including said heat exchangers I and II of the heat recovery device according to the invention. The draught valve 10 situated in the inlet of the flue gas duct 1 will normally be controlled such that a constant preferred draught is maintained in each combustion chamber.

In plants where a great amount of waste water is available, this waste water, if being alkaline can be used as the protective fluid in the first heat exchanger I (with or without additives), and as a scrubber fluid in the (wet) second heat exchanger II, thereby, due to the acid content of the flue gases, giving the result that both the flue gases and the waste water are neutralized. The alkaline waste water can pass through control means checking the alkaline content therein. If a predetermined alkaline degree is not contained in the waste water, neutralizing and corrosion protective agents (as butanole amine, NaOH, MgO) may be added.

A small amount of said alkaline fluid is to be sprayed upon the surfaces in the first heat exchanger if two heat exchangers are used and a greater amount of alkaline fluid or waste water can be sprayed upon the surfaces in the second heat exchanger, where the condensation heat is absorbed from said flue gases.

A metering device 12 is connected via a pump to the spraying nozzles 5 and 6 in said chambers 3 and 4 of said duct 1. Alkaline waste water is fed through a line 12 to the cleaning device 2 and further through a line 13 and by means of a pump 14 to the nozzles 5 and 6 and nozzles 15 and 16 provided in the heat exchangers I and II. The nozzles 15 and 16 are arranged in such a manner that they make a reciprocating movement over the tubes of said heat exchangers, as described in the Swedish Pat. No. 8006390-2 in the name of the Applicant. 17, 18, 19 and 20 refer to control throttle valves provided to control the amount of alkaline fluid to be sprayed onto the flue gases, and 21 and 22 refer to stop valves which are open only when the nozzles 15 and 16 are moving in the heat exchangers. A droplet separator 23 is mounted after the second heat exchanger II. As shown in the drawing (see lines 24 and 25) the extra chimney can with suitable arrangements also function as a droplet separator, in which case the droplet separator 23 is superfluous. The neutralized alkaline water is thus fed back to a tank 26 via the lines 24 and 25 and also lines 27 and 28 from the heat exchangers. The neutralized water is then fed through a line 29 to the waste water outlet by means of a pump 30. A by-pass line 31 is connected to the inlet to the cleaning device 2, and fluid from the tank 26 is conducted through said by-pass line 31 by means of a three way valve 32 which opens to the by-pass line 31 whenever the amount of spraying fluid in the wet scrubber has to be greater than the supply of alkaline waste water to the cleaning device. Level sensors 33 and 34 are provided on the tank of the cleaning device 2 and the waste water tank 26, respectively. Cold water is conducted to said second heat exchanger II via a pump 35 through a line 36, and from said heat exchangers II to said first heat exchanger I through a line 37. The heated water is then conducted through a line 38 from the first heat exchanger I to a consumer as for space heating.

The magnitudes of the flows $Q_I$ and $Q_{II}$, respectively (see FIG. 2), of heat absorbing media conducted through the secondary side of said heat exchangers I and II, is controlled such as to maximize the energy recovered, under the limiting boundary conditions imposed by the (real) total system, including process clean hot water requirements and other feedback options available.

As can be seen in FIG. 2, the temperatures at the inlet on the primary side of the heat exchanger I is $T_7$ and at the outlet is $T_6$. In the heat exchanger II the inlet temperature is $T_6$ and the outlet temperature is $T_5$. The inlet temperature of the heat absorbing medium conducted through the secondary side of the second heat exchanger II is $T_1$, and the outlet temperature is $T_2$. The inlet temperature of the heat absorbing medium conducted through the first heat exchanger I is $T_3$, and the outlet temperature is $T_4$.

FIG. 2 shows diagramatically the progress of the temperature, T, and enthalpy, i, in the two heat exchangers. The temperature of the heat absorbing medium conducted through the second heat exchanger II with a flow $Q_{II}$ is increased from the temperature $T_1$ to the temperature $T_2$, and the temperature of the heat absorbing medium conducted through the first heat exchanger I with a flow $Q_1$ is increased from the temperature $T_3$ to the temperature $T_4$. If the same heat absorbing medium is conducted through both heat exchangers I and II through the line 34 the temperature in the heat exchanger I will be increased from the temperature $T_3$ to the temperature $T_{4'}$ shown in FIG. 1 through the line 37.

As can be seen from FIG. 1 the sulphurous flue gases and/or the flue gases containing organic acids are being conducted through the primary side of the heat exchangers preferably in such a way that the acid dew point is being passed in the first heat exchanger I and the water dew point is being passed in the second heat exchanger II.

In operation, a protective fluid is applied onto the heat exchanger surfaces, to protect those surfaces from corrosion. This is made possible by the advanced automatic cleaning and fluid distribution system, incorporated into the heat exchangers I and II, as described in the above-mentioned Swedish Pat. No. 8006390-2. Such heat exchangers are, for several years, widely used by many industries to recover heat from, e.g., drying and fixation process in textile, laundry, non-woven detergent and similar industries. In the present application, advantage is taken of such unique and well proven heat exchangers in order not only to keep the heat exchanger surfaces clean from soot and waste water deposits (in the scrubber stage II) but also to continuously apply, during operation and as frequently as required, a corrosion protective film onto the heat exchanger surfaces. However, it is important that the temperature in the first heat exchanger I is not decreased too much due to the fluid being sprayed upon the surfaces. Therefore, it is important that only a small and precisely controllable amount of the corrosion protective fluid is applied upon the surfaces as a thin layer. This application of protective fluid is made repeatedly during operation, and the fluid used is preferably such that a sufficient protective layer is kept on the surfaces of the heat exchanger between consecutive treatments. Preferably the protective layer can also be such as to provide a lubricating effect to facilitate the movement of tube cleaning means along the tubes in said heat exchangers I and II.

It is to be understood that the number of heat exchangers can be amended from one only to more than two.

It is important that the fluid, which will be applied on the surfaces of the heat exchangers, is in the first heat exchanger I supplied at a minimum as is discussed above. The layer of corrosion protective fluid, which is applied upon the surfaces of the heat exchanger or heat exchangers, will be so thin that it does not prevent the transfer of heat from the flue gases to the heat absorbing medium.

While in the drawings a counter flow arrangement is shown, the fluids and gases can flow in other directions in relation to each other. When installing the heat exchangers in an existing plant, it is possible that other flow arrangements must be used due to certain conditions. However the counter flow arrangement is the most efficient when taking the thermo dynamic aspects into consideration.

The use of the heat recovery device according to the invention is not limited to flue gas ducts, but can be used to recover heat from other corrosive gasses.

The invention described herein and shown in the accompanying drawing can be modified within the scope of the accompanying claims.

I claim:

1. A heat recovery device for recovering heat from gases such as sulphurous corrosive flue gases and gases containing organic acids, comprising a first and second indirect heat exchanger means with primary and secondary sides respectively, the corrosive gases being passed in series through the primary sides of the first and second heat exchanger means, the secondary sides of the first and second heat exchanger means being connected to heat absorbing medium flows and means for applying a protective controllable thin layer of a fluid onto the surfaces of the first and second heat exchanger means, wherein the amount of the heat absorbing medium passed through the secondary side of the first heat exchanger means is so related to the amount of flue gases passing through the primary side of the first heat exchanger means that the gas temperature is lowered in a first step past the acid dew point and wherein the amount of the heat absorbing medium passed through the secondary side of the secondary exchanger means is so related to the amount of the treated flue gases passing through the primary side of the second heat exchanger means that the gas temperature is lowered in a second step past the water dew point so as to protect the surfaces of said first and second heat exchanger means from corrosion.

2. A heat recovery device in accordance with claim 1, wherein said means for applying the protective layer is arranged to apply said layer repeatedly.

3. A heat recovery device in accordance with claim 1, wherein said layer comprises a fluid which is sprayed upon said surfaces in such an amount that as little heat as possible is brought away with said fluid.

4. A heat recovery device in accordance with claim 3, wherein said corrosive gases are sulphurous flue gases and/or gases containing organic acids and wherein said first and second heat exchanger means each has spray means for spraying an alkaline fluid upon the heat exchanging surfaces of said first and second heat exchanger means to neutralize the corrosive bases and to protect said surfaces from corrosion.

5. A heat recovery device in accordance wth claim 1, wherein said gases and said heat absorbing mediums are passed in a counter flow fashion through the first and second heat exchanger means.

6. A heat recovery device in accordance with claim 5, wherein the heat absorbing medium of the second heat exchanger means is used as heat absorbing medium for the first exchanger means.

* * * * *